United States Patent [19]

Hanson, Jr. et al.

[11] 4,420,496

[45] Dec. 13, 1983

[54] LOW TEMPERATURE RELEASE AGENT COMPOSITIONS PARTICULARLY USEFUL FOR FROZEN FOOD PRODUCTS

[75] Inventors: Harold W. Hanson, Jr., Newport Beach; Cody Munhofen, Huntington Beach, both of Calif.

[73] Assignee: Par Way Manufacturing Co., Los Angeles, Calif.

[21] Appl. No.: 199,373

[22] Filed: Oct. 21, 1980

Related U.S. Application Data

[63] Continuation-in-part of Ser. No. 89,500, Oct. 30, 1979, abandoned.

[51] Int. Cl.$^3$ .............................................. A23D 5/02
[52] U.S. Cl. .................................. 426/609; 426/662; 426/811
[58] Field of Search ................. 426/302, 609, 662, 389

[56] References Cited

U.S. PATENT DOCUMENTS

| | | | |
|---|---|---|---|
| 2,120,640 | 6/1938 | Craemer | 426/389 X |
| 2,299,743 | 10/1942 | Epstein | 426/662 |
| 2,494,771 | 1/1950 | Markley | 426/662 X |
| 2,555,972 | 6/1951 | Karjala et al. | 426/662 |
| 2,849,318 | 8/1958 | Julian et al. | 426/662 |
| 2,910,362 | 10/1959 | Davis et al. | 426/662 X |
| 3,189,466 | 6/1965 | McGrory | 426/609 X |
| 4,155,770 | 5/1979 | Doumani | 426/609 X |

FOREIGN PATENT DOCUMENTS

| | | | |
|---|---|---|---|
| 532392 | 10/1956 | Canada | 426/662 |

OTHER PUBLICATIONS

Chemicals Used in Food Processing, Nat'l Academy of Sciences—Nat'l Res. Council, Wash. D.C. 1965, p. 267.

*Primary Examiner*—Robert A. Yoncoskie
*Attorney, Agent, or Firm*—Frank Frisenda, Jr.

[57] ABSTRACT

The present invention provides release agent compositions which are particularly useful for frozen food products and to methods for using such compositions in relatively low temperature environments. In accordance with one embodiment of the invention, the release agent compositions comprise one or more oils which remain liquid when held at a temperature of below about 0° F. for at least 24 hours, and are characterized by having a relatively high degree of unsaturation, for instance above about 80 weight percent. Suitable oils for the first mentioned component of the inventive compositions include almond oil, apricot kernel oil, safflower seed oil, walnut oil, cherry kernel oil, grape seed oil and the like and mixtures thereof. The oil component is blended with lecithin in one embodied form, and with lecithin and white mineral oil of specified grade having a Saybolt viscosity at 100° F. of at least about 250. Further, optional additives may be included in the release agent compositions to minimize undesired adhesion between contacting material surfaces such as frozen food products and associated processing or conveying equipment. Accordingly, the unique release agent composition remain substantially liquid even when stored at below freezing temperatures for relatively long periods of time. Moreover, the inventive compositions produce a more uniform coating on applied surfaces when compared with conventional release agents owing to the unique anti-congealing and anti-hardening characteristics of the novel compositions.

10 Claims, No Drawings

LOW TEMPERATURE RELEASE AGENT COMPOSITIONS PARTICULARLY USEFUL FOR FROZEN FOOD PRODUCTS

CROSS REFERENCE TO RELATED APPLICATIONS

This application is a continuation in part of our prior U.S. Application Ser. No. 89,500, filed Oct. 30, 1979 entitled: "LOW TEMPERATURE RELEASE AGENT COMPOSITIONS PARTICULARLY USEFUL FOR FROZEN FOOD PRODUCTS" not abandoned.

BACKGROUND OF THE INVENTION

The present invention relates to release agent compositions which are particularly useful for frozen food products and to methods for using such compositions in relatively low temperature environments. The release agent compositions in accordance with the present invention comprise at least one oil having specified congealing characteristic and fatty acid unsaturation levels which is blended with lecithin and mineral oil of a prescribed grade and viscosity to provide a blend which will remain liquid even at sub-freezing temperatures for relatively long time periods.

The freezing of foods, whether in their finished form or intermediary form, is becoming recognized as one of the best ways to guarantee that the food will maximally retain its natural taste, texture, color, and freshness even when stored for many months. In the field of food processing, the use of release coatings has long been recognized as an effective way to reduce production costs by limiting food waste. In fact, effective release agents are becoming more and more critical to a successful operation of a completely automated processing procedure.

Many large frozen food processing plants are high production, completely automated plants, where having a carefully designed release agent would make a substantial contribution to speed and efficiency of the manufacturing process. For example, when a conveyor belt reaches the end of its line, all goods must fall off to insure the proper functioning of the overall automated process. Moreover, release agent compositions would be beneficial from a retail standpoint because many consumers prefer food products that neither stick together nor adhere too tightly to surfaces of associated packaging materials.

In general, most processed foods have either natural moisture or juices or have had these ingredients imparted to the food during processing procedures. Often, water is applied just prior to freezing the food to produce a glaze of ice which acts as a protective barrier for the frozen products. However, when the moisture or juices freeze, this often produces sticking to processing and conveying equipment surfaces and in some cases, sticking of products to each other. Such surfaces include solid and wire mesh freezer conveyor belts, freezing trays, elevator buckets, holding tubs, and the like.

Moreover, it is desirable, if not necessary, in many instances, to provide a mechanism which will release frozen food from sidewalls of a package to insure that proper taste, texture, and other desired properties are preserved from processer to consumer. In some instances, a release agent coating on individual pieces of frozen food which are packaged together, for instance in a boilable bag, is desired to insure that the frozen food products will not stick to each other during boiling. In this respect, an important feature of the release agent composition is that it be capable of producing a uniform coating, for instance by means of a spray nozzle, to provide consistency within processing parameters. Further, the release agent composition must not clog or otherwise hamper the equipment which applies the release agent coating to the product.

The problem of sticking between material surfaces in contact is particularly severe in the frozen food industry where moisture present on the outer surface of the product will freeze and act as a cementing agent. Freeing material surfaces which are undesirably stuck together in low temperature environments is usually accomplished by mechanical means, but this mechanism is generally inefficient and often results in marred or broken product surfaces, and sometimes, products which are no longer sellable.

A variety of release compositions are known to those skilled in the art. These are usually vegetable oil or fat based compositions which are not able to provide lubrication over a full temperature range especially relatively low temperature. In this regard, while these compositions alleviate sticking problems encountered during normal processing temperatures (from about 55° F. to about 450° F.), they are usually inadequate at temperatures below freezing.

An alternative means to minimize adhesion between contacting material surfaces involves placing waxed or silicone treated papers between the frozen products, as for example, between frozen hamburger patties. While this means is sometimes acceptable, it is relatively expensive and impractical for many foods.

Accordingly, release agents capable of withstanding cold temperature, below freezing, without significant congealing or hardening and producing a uniform coating to applied material surfaces has been recognized by those skilled in the art as a need in many processing industries, particularly frozen food processing. The present invention fulfills this need.

SUMMARY OF THE INVENTION

This invention provides release agent compositions which are particularly effective at temperatures below freezing for extended time periods and methods for using such compositions.

In accordance with one embodiment of the invention, release agent compositions are provided which are especially useful for frozen food products and processing thereof in low temperature environments. The release agent compositions comprise one or more oils to remain substantially liquid at temperatures below about 0° F. when held for a minimum of 24 hours, and are characterized by a relatively high degree of unsaturation, for instance above about 80 weight percent. Suitable oils for the foregoing component of the inventive compositions include almond oil, apricot kernel oil, safflower seed oil, walnut oil, cherry kernel oil, grape seed oil and the like and mixtures thereof. The oil component is blended in a first embodied form with lecithin, and in a second embodied form with lecithin and white mineral oil of specified grade having a Saybolt viscosity at 100° of at least 250. Further, optional additives may be included in the compositions to minimize undesired adhesion between contacting material surfaces such as frozen food products and associated processing or conveying equipment. Accordingly, the unique release agent composition exhibit unexpected and surprising anti-congealing and anti-hardening characteristics and remain substantially liquid even when stored at sub-freezing temperatures for relatively long periods of time. Moreover, the inventive compositions produce a more uniform coating on applied material surfaces when compared with conventional release agents.

A novel feature of the first embodied release agent compositions, prescribed oil and lecithin, is the use of the release agent compositions in low temperature environments providing compositions that retain capabilities of reducing surface tensions when applied to food products or other surfaces at temperatures of from about 40° F. to about minus 150° F.

Novel features of the second embodied release agent compositions include both the composition itself and the use of the composition at relatively low temperature environments to minimize undesired adhesion between contacting material surfaces.

Other features and advantages of the present invention will become apparent from the following detailed description and the claims appended thereto.

DESCRIPTION OF THE PREFERRED EMBODIMENTS

Initially, it should be noted that a release agent is a material which is substantially and significantly different from a shortening. Generally, shortenings are manufactured mainly for two purposes: (1) to make baked foods having a short tender crumb, such as cakes, cookies, crackers, and the like; and (2) to make fried foods having a tender golden brown crust, such ad donuts, fried potatoes and the like. On the contrary, food release coatings are manufactured for one purpose only and that is to keep food from sticking, for example, to processing surfaces, containers or conveyors.

The present invention provides release agent compositions and methods of using such compositions in low temperature environments. In accordance with a first embodiment of the invention, the compositions comprise one or more oils which remain substantially liquid at temperatures below about 0° F. when held for at least 24 hours, the oil further being characterized by having a relatively high degree of unsaturation, that is, above about 80 weight percent; blended with lecithin. Suitable oils include almond oil, apricot kernel oil, safflower seed oil, walnut oil, cherry kernel oil and grape seed oil and the like and mixtures thereof.

Optional selected additives which will not deleteriously affect low temperature characteristics of the oil may further be included in the first embodied compositions, yielding a release agent capable of minimizing undesired adhesion to a wide variety of substrates encountered in low temperature environments such as frozen food processing.

Thus, the first embodied blends can be poured at relatively low temperatures and possess unique anticlogging characteristics which is especially useful for applying such compositions through use of spray nozzles.

In accordance with a second embodiment of the invention, the compositions comprise one or more oils which remain substantially liquid at temperatures below about 0° F. when held for at least 24 hours, the oil further being characterized by having a relatively high degree of unsaturation, that is, above about 80 weight percent; blended with lecithin and white mineral oil of specified pour point and having a Saybolt viscosity at 100° F. of at least 250. Suitable oils for the first mentioned component of the compositions include almond oil, apricot kernel oil, safflower seed oil, walnut oil, cherry kernel oil, grape seed oil, and the like and mixtures thereof.

As with the first embodied compositions, optional selective additives which will not deleteriously affect low temperature characteristics of the composition may further be included in the blend to enhance the capability of the release agent for minimizing undesired adhesion to a wide variety of substrates encountered in low temperature environments.

An effective release agent applied to materials primarily functions by lowering the surface tension between contacting surfaces. Accordingly, through the use of these second embodied compositions sticking can be minimized even at low temperatures from about 40° F. to about minus 150° F.

One novel feature of the present invention resides in the discovery that compositions consisting of selected oils combined with specific components such as lecithin and prescribed mineral oil suprisingly remain substantially liquid even when kept at temperatures below pour point temperatures of the individual ingredients of the compositions. Furthermore, these inventive compositions can function effectively as release agents at even lower temperatures whether such compositions are in a liquid, semi-solid or in some cases fully solid state, possibly due in part to the tendency of the compositions to gelatinize before freezing.

In accordance with the present invention, the first embodied release agent compositions comprise from about 4 to about 18 percent lecithin, and preferably from about 5 to about 12 percent lecithin and the remainder of the composition being at least 1 oil which remains substantially liquid when held at a temperature of below about 0° F. for at least 24 hours, and characterized by having a relatively high degree of unsaturation, above about 80 weight percent.

In accordance with the present invention, the second embodied release agent compositions comprise from about 4 to about 18 weight percent lecithin, and preferably from about 5 to about 12 weight percent lecithin; from about 20 to about 80 weight percent prescribed mineral oil; and remainder of the composition being 1 or more oil which remains substantially liquid when held at a temperature of below about 0° F. for at least 24 hours, and characterized by having a relatively high degree of unsaturation, above about 80 weight percent.

The lecithin component of the first and second embodied release agent compositions in accordance with the invention is not necessarily soluble in the oil components but may remain as a suspension of lecithin in oil. One suitable grade of lecithin is crude lecithin 60 A.I. having a specific gravity at 25° C. of about 1.04–1.06 g./cc, a refractive index at 25° C. of about 1.4845, viscosity at 80° F. of 10,000 c.p.s. and iodine value of about 95 units. Further disclosure regarding normally fluid compositions containing vegetable lecithin and oil capable of use in food grade oil blends may be had by reference to U.S. Pat. No. 2,494,771 issued to Markley which is hereby incorporated by this reference.

The mineral oil component of the second embodied inventive release agent compositions in accordance with the invention is a white mineral oil, food grade, preferably having a Saybolt viscosity at 100° F. in the range of from about 345 to about 355 and a specific gravity at 15.6° C. of from about 0.880 to about 0.895. The maximum pour point of the mineral oil is preferably minus 18° C., and minimum flash point temperature in the range of from about 200° to about 216° C. Further, preferably the mineral oil component is present in the composition in an amount of from about 40 to about 80 weight percent.

Various optional additives may also be included in the release agent compositions in accordance with the present invention. The optional additives must not deleteriously affect the low temperature characteristics of the composition, that is, anti-congealing and anti-hardening characteristics as well as the composition's ability to produce a uniform coating on applied surfaces. Accordingly, both the first and second embodied release agent compositions may include effective amounts of oxystearin, propylene glycol, fatty esters of sorbitol or fatty esters of other high alcohols, and ethylene derived hydrocarbon polymer, which is liquid at room temperature and remains fluid at temperatures below about the freezing point of water.

Typically, the oxystearin component may be present in the composition in an amount from about 0.005 weight percent to about 0.025 weight percent. Propylene Glycol is typically present from about 10 weight percent to about 75 weight percent of the blend. Fatty esters of sorbitol may be present from about 0.0125 weight percent to about 0.23 weight percent. Typically, the ethylene derived hydrocarbon polymer is present in amount from about 0.0125 weight percent to about 20 weight percent.

One particularly suitable oxystearin is trade named "Chillox 100" which is purported to be a mixture of glycerides of partially oxidized stearic fatty acids obtained by heating a hydrogenated cottonseed or soybean oil under controlled condition and pressure and air with suitable catalyst. One particularly suitable ethylene derived hydrocarbon is "Vybar 825" which is purported to have a pour point of below about −30° F. and a viscosity at 100°F. of about 530 conducted by ASTM test method D-3236, a density at 75° F. of about 0.86 grams per cubic centimeter and an iodine number conducted by ASTM test method D-1959 of about 30 cgI$_2$/G sample. Vybar 825 is a trade named item marketed by Petrolight Corporation, Bareco Division.

The foregoing optional additives are designed to enhance the low temperature characteristics of the first and second embodied release agent compositions but are not critical to the compositions in accordance with the invention.

A further low temperature characteristic of the oil or oils selected for the first component of the release agent compositions in accordance with the present invention, is that the fatty acid contents are primarily found to be oleic (C 18:1) and linoleic (C 18:2).

The following illustrative examples will serve to further define the low temperature release agent composition in accordance with the present invention.

EXAMPLE 1

A low temperature release agent was prepared from the following ingredient. 4% crude lecithin 60 A.I. having a specific gravity at 25° C. of from about 1.04 to about 1.06 grams per cubic centimeter, a refractive index at 25° C. of 1.4845; a viscosity at 80° F. of 10,000 CPS and iodine value at 95 units; a saponification value of about 196 and a flash point of about 450° F. to the lecithin at room temperature a mineral oil is added at about 45% by weight. The mineral oil is a white mineral oil having a Saybolt viscosity at 100° F. of from about 320 to about 330 and a specific gravity at 15.6° C. of about 0.880 to about 0.890. The maximum pour point of the mineral oil is 118° C. and a minimum flash point of 202° C. The remainder of the release agent composition is almond oil, having a specific gravity at 25° C. of about 0.913 to about 0.916, a refractive index at 40° C. of about 1.463 to about 1.466, an iodine number of from abut 93 to about 106 containing about 5% of saturated and about 95% of unsaturated fatty acids, distributed as 77 weight percent oleic and 17 weight percent linoleic.

Evaluation at a temperature range of from about −26° F. to about −27.8° F. revealed good release characteristic when applied to substrate surfaces, good sprayability and remaining substantially liquid even when stored 48 hours.

EXAMPLE 2

The procedure of example 1 is repeated to produce a low temperature release agent composition from the following component:

| COMPONENT | WEIGHT PERCENT |
|---|---|
| lecithin | 6 |
| mineral oil | 60 |
| apricot kernel oil | remainder |

The apricot kernel oil selected for the foregoing composition had characteristics very similar to that of almond oil. A typical sample had an iodine number of 109; saponification number, 190; saturated fatty acid 3.6 weight percent, oleic acid 61 weight percent; and linoleic acid 30 weight percent.

EXAMPLE 3

The procedure of Example 1 was repeated to produce a low temperature release agent composition with the following components:

| COMPONENT | WEIGHT PERCENT |
|---|---|
| lecithin | 12 |
| safflower seed oil | 60 |
| walnut oil | 28 |

The safflower seed oil had a specific gravity at 25° C. of from about 0.919 to about 0.924, a refractive index at 25° C. of about 1.472 to about 1.475, an iodine number of from about 140 to 150, a saponification number of about 188 to about 194. The average composition was about 5.7 weight percent saturated acid, 16.4 weight oleic acid, and linoleic acid of about 77.9.

The walnut oil component had a specific gravity of about 0.9235 at 25° C., an iodine value of from about 150 to about 162, a saponification value of about 190 to 197, a melting point of −12° to about −16° C., a linoleic fatty acid content of about 69.7 weight percent and a oleic acid content of about 16.9 weight percent.

EXAMPLE 4

| COMPONENT | WEIGHT PERCENT |
|---|---|
| lecithin | 16 |
| grape seed oil | 84 |

The grape seed oil component was characterized by an iodine number of about 124 to about 143; saponification number 178 to about 196; an unsaponification matter of about 0.3 to 1.6; a congealing point of −12° to about 31 20° C.; saturated acids from about 8 to about 16 weight percent and unsaturated acid from about 85 to about 90 weight percent. The fatty acids consist of about 12 to about 33% oleic and about 45 to about 72 weight percent linoleic.

EXAMPLE 5

| COMPONENT | WEIGHT PERCENT |
|---|---|
| lecithin | 18 |
| mineral oil | 70 |
| walnut oil | 12 |

Although the foregoing examples recite specific oils for the release agent compositions in accordance with the present invention, those skilled in the art will appreciate that other suitable oil closely corresponding to the aforementioned characteristics, including anti-congealing and anti-hardening characteristics may be substituted for those specifically listed. In this respect, animal fats, coconut oil, palm oil, peanut oil and olive oil, are specifically not desirable in the release agent composition, due to their relatively high fat content, which promotes excessive congealing and or hardening of the composition in low temperature environments.

The release agent compositions of the present invention were developed to retard the severity of sticking in conjunction with mechanical methods of removing frozen food pieces without having costly product damage, for instance, by such food pieces becoming stuck to one another or to conveying surfaces, or to processing surfaces. In this respect, release agents of the prior art would, under normal processing temperatures (e.g. 55° F. to 450° F.) generally be suitable for overcoming product damage or loss associated with sticking.

Although viscosity can be greatly reduced if release agents are heated to temperatures of from about 90° F. to about 120° F., in low temperature environments, when known release agents are used, even at moderately low temperatures (from about 40° F. to about 25° F.), the inherent reduced surface tensions beneficial characteristics, of such known release agents and viscosity are substantially nullified and accordingly provide little or no release value.

It should also be noted that if the release agent of the present invention are used for food processing, ingredients of the compositions must comply with governmental standards. In this respect, the Food and Drug Administration strictly controls foods additive which should be consulted to provide requirements of acceptable components.

Any conventional method of blending the components of the release agent can be utilized such as through the use of known mixers, stirrers and the like. Methods of using the release agent of the present invention should be readily apparent to those skilled in the art from the foregoing description and dependent claims.

To demonstrate the significant advantage of the present invention, various release agent compositions were tested in low temperature environments. The pour points were determined by the method described in the *American Society of Testing Materials Standard Method Manual* in Section D-97-47.

LOW TEMPERATURE TEST RESULTS

| Composition | PourPoint | Refrigerated Storage | | | | |
|---|---|---|---|---|---|---|
| | | −26° F. | | −27.2° F. | | −27.8° F. |
| | | Day 1 | Day 2 | Day 1 | Day 2 | 3 Weeks |
| Safflower Seed Oil | −11° F. | Liq. | Liq. | Liq. | Sol. | Sol. |
| Safflower Plant Oil | −17° F. | Sol. | Sol. | Sol. | Sol. | Sol. |
| Almond Oil | −22° F. | Sol. | Sol. | Sol. | Sol. | Sol. |
| Almond Oil, 94% 6% Lecithin | −13° F. | Liq. | Liq. | Liq. | Liq. | ¼ Sol. |
| Almond Oil, 54% Mineral Oil, 40% 6% Lecithin | −6° F. | Liq. | Liq. | Liq. | Liq. | ¼ Sol. |

Finally, it should be noted that the exact release agent composition utilized will vary greatly within the foregoing ranges and may be applied to the desired surface(s) by a wide variety of known means depending upon the specific food product and the processing operation involved. For example, it may be preferable to apply the release agent by spray. This can be accomplished by mechanical sprayers or alternatively, by adding aerosol propellants to containerized composition. Representative propellants are disclosed in U.S. Pat. No. 2,849,323 issued to Young on Aug. 26, 1958; U.S. Pat. No. 2,952,547 issued to Hill, Jr. on Sept. 13, 1960; U.S. Pat. No. 3,490,923 issued to Eiseman, Jr. on Jan. 20, 1970; and "Grenetron 152a" which is commercially available from Allied Chemical, Morriston, N.J. which is hereby incorporated by this reference.

Further in accordance with the present invention, methods for using the first embodied and second embodied release agent compositions can be summarized as follows. A method for the reduction of surface tension and adhesion between contacting material surfaces in a low temperature environment having temperature range of from abut 40° F. to about −150° F., the method comprising the steps of:

(a) providing a release agent composition comprising from about 4 to about 18 weight percent lecithin, remainder at least one oil which is substantially liquid when held at a temperature of below about 0° F. for at least 24 hours, and having a relatively high degree of unsaturation, above about 80 weight percent; and (b) applying the release agent composition to at least one contacting surface of the material in an amount effective to substantially reduce the surface tensions and adhesions between contacting material surfaces.

In a further embodied method, the release agent composition additionally includes white mineral oil having a Saybolt viscosity at 100° F. of at least about 250.

It will also be apparent that various modifications to the foregoing disclosure can be made by those skilled in the art without departing from the spirit and scope of the invention.

We claim:

1. A method for the reduction of surface tension and adhesion between contacting material surfaces in a low temperature range comprising the steps of:
   (a) providing a release agent composition comprising:
      (i) from about 4 to about 18 weight percent lecithin;
      (ii) from about 20 to about 80 weight percent white mineral oil having a Saybolt viscosity at 100° F. of at least about 250 and a specific gravity at 15.6° C. of from about 0.880 to about 0.895; and
      (iii) remainder being at least one oil which is substantially liquid when held at a temperature of below about 0° F. for at least 24 hours and a relatively high degree of unsaturation, above about 80 weight percent; and
   (b) applying said release agent composition to at least one contact surface of said material in an amount effective to substantially reduce the surface tensions and adhesion between contacting material surfaces; wherein the reduction of surface tension and adhesion between contacting material surfaces is effected in a low temperature range of from about 40° F. to about −150° F.

2. The method as defined in claim 1 wherein said oil is almond oil.

3. The method as defined in claim 1 wherein said oil is apricot kernel oil.

4. The method as defined in claim 1 wherein said oil is safflower seed oil.

5. The method as defined in claim 1 wherein said oil is cherry kernel oil.

6. The method as defined in claim 1 wherein said oil is grape seed oil.

7. The method as defined in claim 1 wherein lecithin is present in said release agent composition in an amount of from 5 to about 12 weight percent.

8. A method as defined in claim 1 wherein said release agent composition further comprises oxystearin in an amount of from about 0.005 weight percent to about 0.025 weight percent.

9. The method as defined in claim 1 wherein said release agent composition further comprises propylene glycol in an amount of from about 10 weight percent to about 75 weight percent.

10. The method as defined in claim 1 wherein said release agent composition further comprises fatty esters of sorbitol in an amount of from about 0.0125 weight percent to about 0.23 weight percent.

* * * * *